United States Patent
Patel et al.

(10) Patent No.: US 10,681,746 B2
(45) Date of Patent: Jun. 9, 2020

(54) WIRELESS ENABLED HARD DRIVE MANAGEMENT

(71) Applicant: Lenovo Enterprise Solutions (Singapore) Pte. Ltd., Singapore (SG)

(72) Inventors: Pravin Patel, Cary, NC (US); Theodore Brian Vojnovich, Raleigh, NC (US); Luke Remis, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 422 days.

(21) Appl. No.: 15/379,380

(22) Filed: Dec. 14, 2016

(65) Prior Publication Data
US 2018/0165028 A1 Jun. 14, 2018

(51) Int. Cl.
*G06F 3/06* (2006.01)
*H04W 76/10* (2018.01)
*H04W 4/80* (2018.01)

(52) U.S. Cl.
CPC .......... *H04W 76/10* (2018.02); *G06F 3/0604* (2013.01); *G06F 3/067* (2013.01); *G06F 3/0632* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 8,046,504 | B2* | 10/2011 | Feinberg | G06F 9/445 710/20 |
| 8,966,601 | B2* | 2/2015 | Green | H04L 9/0827 380/270 |
| 9,118,887 | B2* | 8/2015 | Okuhara | H04N 5/907 |
| 9,686,436 | B2* | 6/2017 | Sato | H04N 5/772 |
| 9,888,451 | B2* | 2/2018 | Ido | G06K 9/00577 |
| 2016/0179424 | A1* | 6/2016 | Sato | H04N 5/772 348/231.9 |
| 2016/0321011 | A1* | 11/2016 | Sato | G06F 3/0659 |
| 2017/0017428 | A1* | 1/2017 | Salessi | G06F 12/1009 |
| 2017/0099646 | A1* | 4/2017 | Ido | G06K 9/00577 |

* cited by examiner

*Primary Examiner* — Tuan A Tran (57) ABSTRACT

A method, according to one embodiment, includes: establishing a wireless connection between a wireless receiver in a solid state drive and a mobile device, receiving configuration instructions from the mobile device via the wireless connection, sending the received configuration instructions to a processor in a second device via a physical electrical connection coupling the second device to the solid state drive, receiving data from the second device via the physical electrical connection coupling the second device to the solid state drive, and storing the data in a memory of the solid state drive according to the received configuration instructions. Other systems, methods, and computer program products are described in additional embodiments.

20 Claims, 5 Drawing Sheets

WIRELESS ENABLED HARD DRIVE MANAGEMENT

FIELD OF THE INVENTION

The present disclosure relates to the drive management, and more particularly, to establishing a wireless connection with a drive environment that may be used to management the drive.

BACKGROUND

A storage drive typically includes a high-capacity, self-contained storage device containing a read/write mechanism which has access to memory included within a sealed unit. A solid state drive (SSD) is a solid-state type of storage drive which uses integrated circuit assemblies as memory to store data therein. SSD technology primarily uses electronic interfaces compatible with other types of storage drives.

SSDs have no moving mechanical components, which distinguishes them from traditional electromechanical magnetic disks such as hard disk drives (HDDs) or floppy disks. The latter contain spinning disks and movable read/write heads. Compared with electromechanical disks, SSDs are typically more resistant to physical shock, run silently, have lower access time, and lower latency.

The management of storage drives involves implementing formatting changes, and in some instances, removing a drive altogether, e.g., for replacement. Conventionally, storage drive management is performed using host operating systems which require being physically logged into the operating system of the storage drive itself in order to make any such changes. However, this is undesirable, as the operating system may not be configured to receive drive management commands from a user physically at the storage location. For instance, the operating system may not include a keyboard, a display screen, a mouse, etc.

Thus, it would be beneficial to provide systems, methods, computer program products and the like which overcome the storage drive management shortcomings. Accordingly, the ability to perform storage drive management operations via a wireless connection to the storage drive is desirable.

SUMMARY

A method, according to one embodiment, includes: establishing a wireless connection between a wireless receiver in a solid state drive and a mobile device, receiving configuration instructions from the mobile device via the wireless connection, sending the received configuration instructions to a processor in a second device via a physical electrical connection coupling the second device to the solid state drive, receiving data from the second device via the physical electrical connection coupling the second device to the solid state drive, and storing the data in a memory of the solid state drive according to the received configuration instructions.

A method, according to another embodiment, includes: establishing a wireless connection between a wireless receiver in a solid state drive and a mobile device, and sending configuration instructions to the wireless receiver in the solid state drive via the wireless connection. Moreover, the wireless connection between the wireless receiver in the solid state drive and the mobile device is only usable to send configuration instructions.

A system, according to yet another embodiment, includes: a solid state drive which includes: a wireless receiver, and a physical connection port. The physical connection port of the solid state drive establishes a physical electrical connection between the wireless receiver and a processor in a second device. Moreover, the solid state drive establishes a wireless connection with an electrical device, and the solid state drive sends configuration instructions received by the wireless receiver from the electrical device to the processor in the second device. Furthermore, the solid state drive receives data from the second device physically connected to the solid state drive via the physical connection port.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of improved storage drive management, and/or related systems and methods. Accordingly, some of the embodiments described herein may be able to increase the ease of access for verified users and thereby increase task efficiency by implementing wireless storage drive management, as will be described in further detail below.

In one general embodiment, a method includes: establishing a wireless connection between a wireless receiver in a solid state drive and a mobile device, receiving configuration instructions from the mobile device via the wireless connection, sending the received configuration instructions to a processor in a second device via a physical electrical connection coupling the second device to the solid state drive, receiving data from the second device via the physical electrical connection coupling the second device to the solid state drive, and storing the data in a memory of the solid state drive according to the received configuration instructions.

In another general embodiment, a method includes: establishing a wireless connection between a wireless receiver in a solid state drive and a mobile device, and sending configuration instructions to the wireless receiver in the solid state drive via the wireless connection. Moreover, the wireless connection between the wireless receiver in the solid state drive and the mobile device is only usable to send configuration instructions.

In yet another general embodiment, a system includes: a solid state drive which includes: a wireless receiver, and a physical connection port. The physical connection port of the solid state drive establishes a physical electrical connection between the wireless receiver and a processor in a second device. Moreover, the solid state drive establishes a wireless connection with an electrical device, and the solid state drive sends configuration instructions received by the wireless receiver from the electrical device to the processor in the second device. Furthermore, the solid state drive receives data from the second device physically connected to the solid state drive via the physical connection port.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 1:
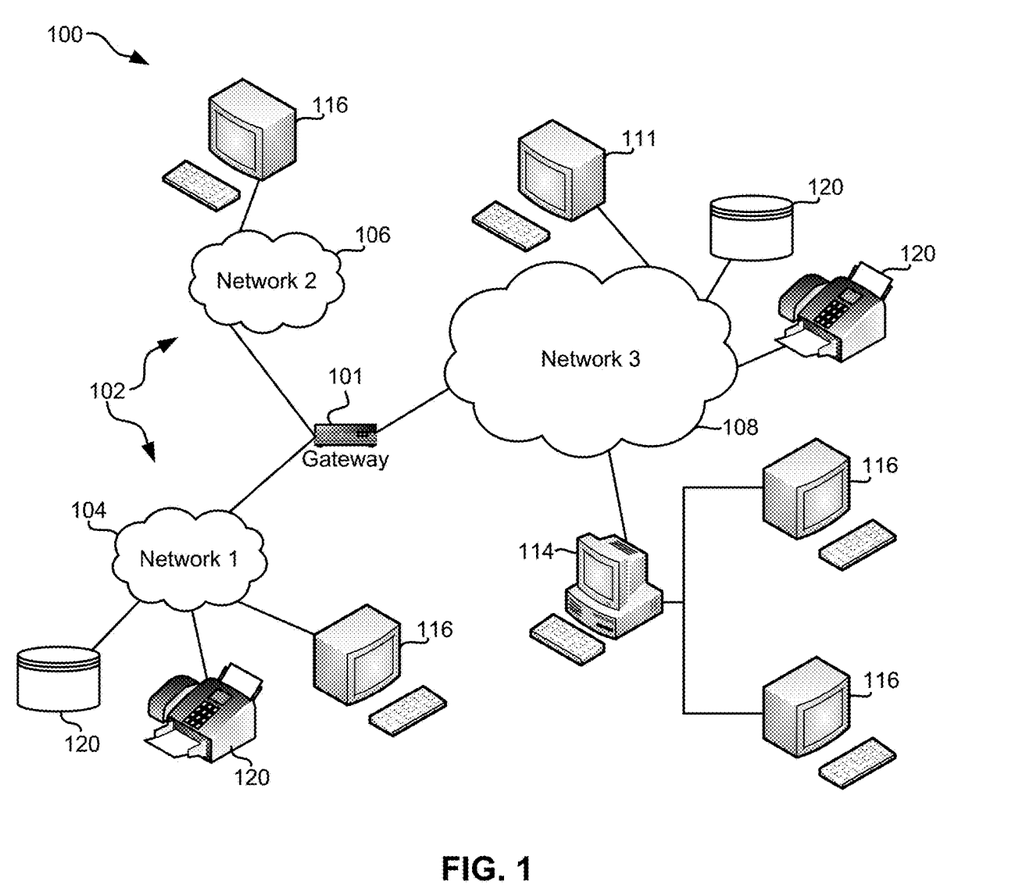
FIG. 1 is a schematic drawing of a computer network environment, according to one approach.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
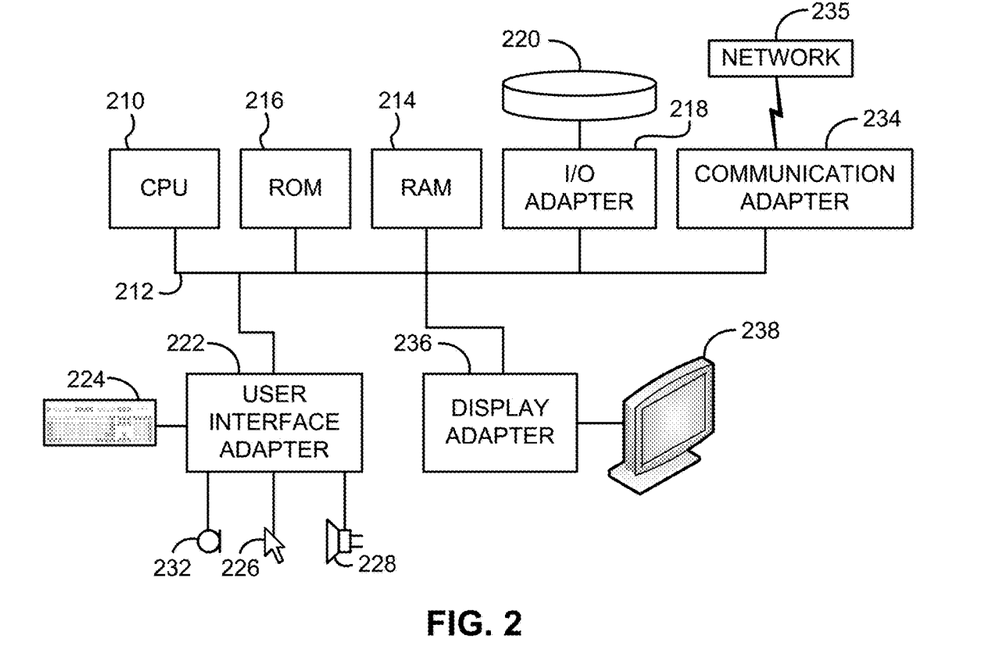
FIG. 2 is a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As previously mentioned, management of storage drives involves implementing formatting changes, and in some instances, removing a drive altogether, e.g., for replacement. Conventionally, storage drive management is performed using host operating systems which require being physically logged into the operating system of the storage drive itself in order to make any such changes. However, this is undesirable, as the operating system may not be configured to receive drive management commands from a user at the storage location. For instance, the operating system may not include a keyboard, a display screen, a mouse, etc. Thus, the ability to perform storage drive management operations via a wireless connection to the storage drive is desirable.

In sharp contrast to the conventional shortcomings described above, various embodiments described herein enable storage drive management without actually being logged into the physical operating system of the storage drive itself. Thus, storage drive management may be performed without physically being at a terminal of the storage drive. In other words, storage drive management may be enabled using a wireless interface into a server associated with one or more storage drives, as will be described in further detail below.

Figure 3:
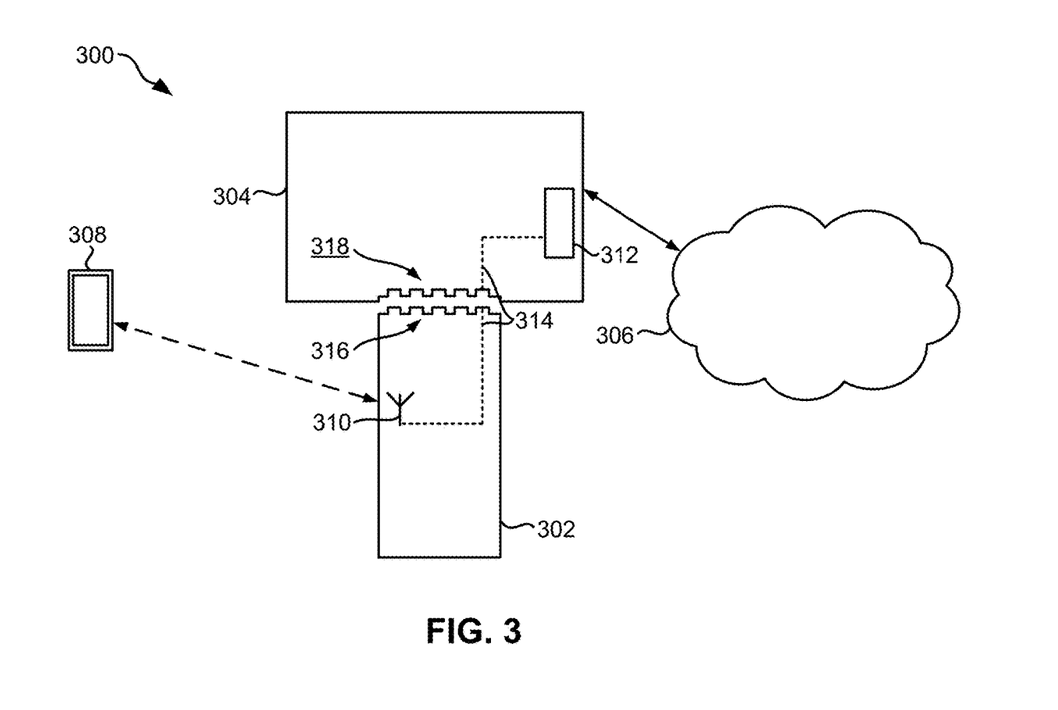
FIG. 3 is simplified schematic view of a computer system, according to one embodiment.

Looking to FIG. 3, a computer system 300 is illustrated in accordance with one embodiment. As an option, the present computer system 300 may be implemented in conjunction with features from any other embodiment listed herein, such as those described with reference to the other FIGS., such as FIGS. 1-2. However, such computer system 300 and others presented herein may be used in various applications and/or in permutations which may or may not be specifically described in the illustrative embodiments listed herein. Further, the computer system 300 presented herein may be used in any desired environment. Thus FIG. 3 (and the other FIGS.) may be deemed to include any possible permutation.

Computer system 300 includes a storage drive 302 and a server 304. The storage drive 302 and server 304 are preferably electrically coupled to each other, e.g., such that electrical signals may be transmitted therebetween when the storage drive 302 is engaged with the server 304. In some approaches, the storage drive 302 and server 304 may be electrically coupled via a physical connection formed when a physical connection port 316 (e.g., interface connector) of the storage drive 302 is coupled to a corresponding receiving physical connection port 318 of the server 304. Although the storage drive 302 and server 304 are illustrated in the present embodiment as having a small separation between their respective physical connection ports 316, 318, the two may be physically coupled together by engaging the physical connection ports 316, 318, as would be apparent by one skilled in the art. However a physical connection between the storage drive 302 and the server 304 may be formed by a cable, a wire, a physical network connection (e.g., an Ethernet cable), etc., in other approaches.

It should also be noted that the server 304 may also be coupled to a wireless network 306. Network 306 may be a wireless personal area network (WPAN), a LAN, a WAN, a global area network (GAN), etc., or other types of wireless networks. In addition, various combinations of wired, wireless (e.g., radio frequency) and optical communication links may be utilized to form the overall network 306. Thus, network 306 may be electrically coupled to various other components of computer system 300 and/or other systems physically separated therefrom.

The storage drive 302 is also preferably configured such that it may establish a wireless connection with an electrical device 308, e.g., when in close enough proximity. The wireless device may establish a wireless connection with the storage drive 302 by performing the steps of a predetermined protocol (e.g., see method 600 below). According to various approaches, the wireless connection may be established between the electrical device 308 and storage drive 302 using any desired protocol, e.g., including Bluetooth, near field communication (NFC), WiFi Direct, etc.

It should also be noted that the storage drive 302 may be of any desired type. According to some approaches, the storage drive 302 may be a SSD, but in other approaches, the storage drive 302 may be a hard disk drive (HDD), a random access memory (RAM) drive, etc. To provide a context, and solely to assist the reader, various embodiments may be described with reference to a SSD. This has been done by way of example only, and should not be deemed limiting on the invention. Furthermore, it should be noted that more than one storage drive may be implemented in other embodiments. For example, at least a second storage drive may be included in the computer system 300. Accordingly, the second storage drive, along with any others, may be coupled to the server 304, e.g., using supplemental physical connection ports. Moreover, the second storage drive, along with any other storage drives, would preferably be configured to establish a wireless connection with an electrical device 308 according to any of the approaches described herein.

Referring still to FIG. 3, the storage drive 302 is depicted in the present embodiment as including a wireless receiver 310. When the storage drive 302 and server 304 are electrically coupled via the physical connection formed when physical connection port 316 is coupled to corresponding receiving physical connection port 318, the wireless receiver 310 is also electrically coupled to processor 312 in the server 304. Thus, the wireless receiver 310 and a processor 312 may be electrically coupled via a physical connection 314, e.g., such as a cable, a wire, logical buss, etc., when the physical connection ports 316, 318 are coupled together. According to an example, which is in no way intended to limit the invention the wireless receiver 310 and processor 312 may be electrically coupled using a serial bus path. To operate, the serial bus path may use power from the storage drive, ground, and an I2C bus, as would be appreciated by one skilled in the art upon reading the present description.

Figure 4:
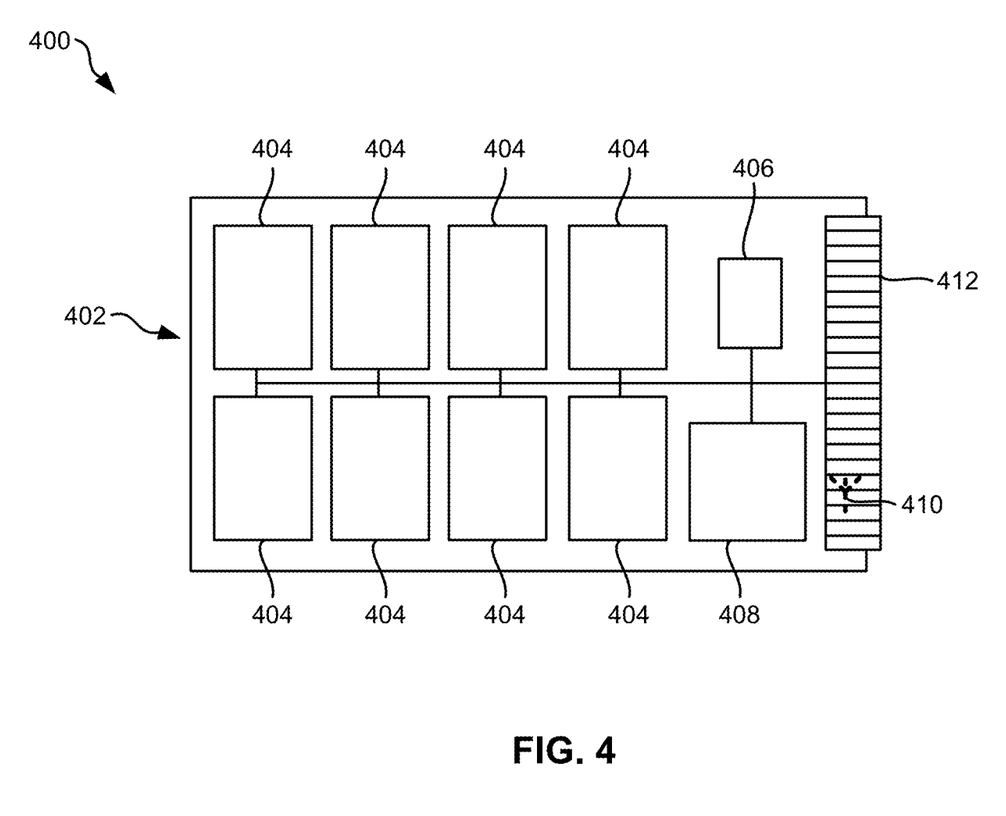
FIG. 4 is a partial schematic view of a storage drive tray, according to one embodiment.

Looking momentarily to FIG. 4, a detailed schematic view of a SSD storage drive tray 400 is illustrated in accordance with one embodiment. As shown, SSD storage drive tray 400 includes a logic board 402 which includes a plurality of non-volatile memory chips 404 (e.g., comprising NAND). Moreover, a cache 406 and controller 408 are included. According to the present embodiment, wireless receiver 410 is positioned beneath interface connector 412. However, in other approaches, the wireless receiver 410 may be positioned differently on the SSD storage drive tray 400.

Returning to computer system 300 of FIG. 3, it should be noted that the wireless receiver 310 may only be used to receive configuration instructions, e.g., from an electrical device wirelessly coupled thereto. In other words, the wireless receiver 310 may not be able (e.g., may not be configured) to receive data to be stored in the storage drive 302 at all. Similarly, it should be noted that the configuration instructions may only be received wirelessly by the storage drive 302. In other words, configuration instructions may only be wirelessly received at the storage drive 302 from the electrical device 308 without using a physical connection between the storage drive 302 and the electrical device 308, e.g., such as a wire, bus, cable, etc.

In some approaches the processor 312 may be configured to perform configuration instructions received by the wireless receiver 310. In other approaches, a processor on the storage drive 302 (e.g., see controller chip 408 of FIG. 4) may be configured to perform configuration instructions received by the wireless receiver 310. The configuration instructions may be received by the wireless receiver 310 directly from the electrical device 308 which may be wirelessly or electrically coupled thereto. The storage drive 302 may also be configured to receive data from a second device (e.g., server 304 and/or any devices coupled thereto) which physically connected to the SSD via the physical connection port 316, as will be described in further detail below.

Referring still to FIG. 3, the wireless connection between the electrical device 308 and the storage drive 302 may be temporary in some approaches, as signified by the dashed line in FIG. 3. However, in other approaches, the electrical device 308 may maintain a lasting wireless connection with the storage drive 302, thereby serving as a designated access point. According to some approaches, the wireless device 308 may be a mobile device, e.g., a cell phone, a tablet with wireless capability, a laptop with a wireless antenna and/or card, etc.

Figure 5:
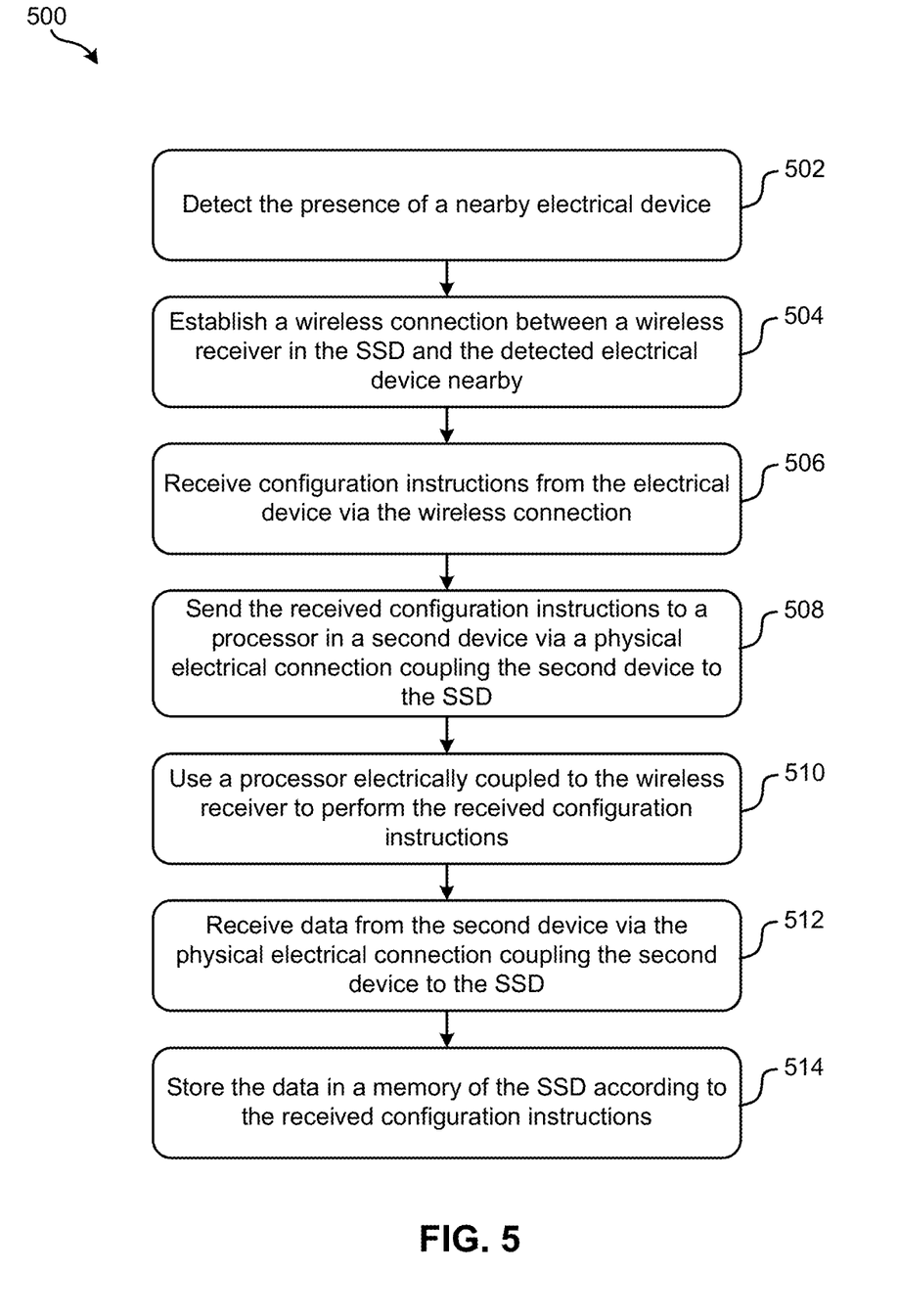
FIG. 5 is a flowchart of a method, according to one embodiment.

The components included in the computer system 300 of FIG. 3 are preferably configured to perform any one or more of the processes included in the various embodiments described herein. According to a first exemplary embodiment, the storage drive 302 may be configured to establish the wireless connection between itself and the electrical device 308. Referring now to FIG. 5, a flowchart of a method 500 for a storage drive establishing a wireless connection between itself and an electrical device is shown according to one embodiment. The method 500 may be performed in accordance with embodiments of the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Although FIG. 5 is described specifically in relation to a host operating system, the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes a storage drive of any type detecting the presence of a nearby electrical device. Solely to place the present method in an exemplary context, the following description will refer to the storage drive as an SSD. This is done by way of example only and without limitation. Again, any type of storage drive may be implemented in the context of the present method.

In some approaches, the SSD may continuously search for the presence of a nearby electrical device when powered on. However, in other approaches, the detecting capability of the SSD may be deactivated (e.g., turned off) as desired, e.g., to save power, while operating conditions are normal, during periods of high storage drive throughput, etc.

The effective detection range of the SSD may vary depend on a signal strength of a wireless receiver included therein, a wireless signal protocol type being used to make the detection, surrounding conditions, predetermined settings, etc. Moreover, as previously mentioned, the electrical device may include a type of mobile device, e.g., such as a cell phone, a tablet with wireless capability, a laptop with a wireless antenna and/or card, etc., depending on the desired approach.

Once a detection has been made, operation 504 includes establishing a wireless connection between a wireless receiver in the SSD and the detected electrical device nearby. For reference, refer back to wireless receiver 310 of FIG. 3 wirelessly connected to electrical device 308. Moreover, as previously mentioned, the wireless connection may be established using any desired protocol, e.g., including Bluetooth, NFC, WiFi Direct, etc. Security measures may also be implemented during the process of establishing the wireless connection between the wireless receiver in the SSD and the detected electrical device nearby. For example, a password may be required before the wireless receiver in the SSD engages in a wireless handshake with the electrical device. The number and type of security measures implemented in a given embodiment may vary depending on the importance of the data included in the storage drive, user preference, operating procedures, etc.

With continued reference to FIG. 5, method 500 also includes receiving configuration instructions from the electrical device via the wireless connection. See operation 506. Again, it is preferred that the configuration instructions are wirelessly received at the SSD from the electrical device without using a physical connection between the SSD and the electrical device (e.g., a wire, bus, cable, etc.). It should also be noted that the wireless connection between the SSD and the electrical device formed in operation 504 is only usable to receive configuration instructions, and not data to be stored in the SSD. It follows that the wireless connection between the SSD and the electrical device may serve exclusively as a medium which allows for configuration instructions (and configuration instructions alone) to be transmitted between a nearby electrical device and the SSD.

Once received, operation 508 includes sending the received configuration instructions to a processor in a second device via a physical electrical connection coupling the second device to the SSD. Furthermore, operation 510 includes using a processor electrically coupled to the wireless receiver to perform the received configuration instructions. The processor used to perform the received configuration instructions may be positioned in a server to which the SSD is physically coupled, e.g., as shown in FIG. 3. Again, a physical connection port of the SSD is preferably configured to establish a physical electrical connection between the wireless receiver and a processor in the server (a second device). Accordingly, the processor in the server may be used to perform the configuration instructions originally received from the electrical device wirelessly connected to the wireless receiver of the SSD.

The processor in the server may be physically coupled to the wireless receiver in the SSD by a serial bus path (e.g., see 310-314 of FIG. 3). The serial bus path may use power from the storage drive, ground, and an I2C bus, as would be appreciated by one skilled in the art upon reading the present description. However, it should also be noted that in some approaches, a processor in the SSD itself may be used to perform one or more of the received configuration instructions (e.g., see controller chip 408 of FIG. 4).

The processor in the server may also be coupled to various other components in the server itself, or a backplane of the system. Accordingly, the processor may be integrated with the operating system of a storage system managing the SSD, among other things. It follows that the configuration instructions received by the processor from the SSD (which in turn received them wirelessly from the electronic device) may be implemented successfully, and the operating system may also be updated accordingly, e.g., depending on the particular configuration instruction being performed.

Configuration instructions may vary in type depending on the approach. For instance, in one approach, the received configuration instructions may include a drive capability inquiry instruction. According to such an approach, the processor in the server may be configured to provide the electrical device access to vital product data associated with the SSD in response to receiving the drive capability inquiry instruction as would be appreciated by one skilled in the art upon reading the present description.

Vital product data may include information about the SSD that allows the SSD to be administered at a system and/or network level. According to various approaches, vital product data may include a product model number, a unique serial number, product release level, maintenance level, etc., and/or other information specific to the SSD type. Vital product data may also include user-defined information, e.g., such as the building and department location of the SSD. The collection and use of vital product data allows the status of a network or computer system to be understood and service provided more quickly. In other words, the capabilities of a storage drive may be determined by accessing the vital product data associated therewith, and presented to a user accordingly. Vital product data may be stored in memory of the SSD to which it corresponds, a designated location in memory in the server, in memory at a remote location, etc., depending on the desired approach.

In another approach, the received configuration instructions may include a physical remove instruction for a given SSD. As previously mentioned, more than one SSD may be implemented in a given system. For instance, more than one storage drive may be coupled to a server in a given embodiment. Accordingly, removal and/or replacement of certain storage drives may be desired during the lifetime of the server. However, physically removing a storage drive during use may result in data loss, storage drive corruption, system failure, etc., particularly in systems without data retention measures such as redundant array of independent disks (RAID) protection. Accordingly, the processor in the server electrically coupled to the wireless receiver may be configured to power down one or more specific SSDs in response to receiving a physical remove instruction corresponding thereto. Powering down the one or more specific SSDs allow the SSDs to subsequently be physically removed from the system (e.g., detached from a server) without resulting in any data errors and/or damage to the SSD itself.

However, the processor in the server may also be able to delay and/or reject a physical remove instruction in response to determining that the instruction may not be successfully performed. In some approaches, the system may not be configured to remove and/or replace a SSD during normal operation. Thus, the physical remove instruction may be denied outright, or postponed until the system returns to an idle state, is powered down, etc. In other approaches, the SSD specified by the physical remove instruction may currently be in use. Thus, the physical remove instruction may be postponed until the SSD is no longer in use, e.g., currently performing operations. A user may be informed that the physical remove instruction has been denied and/or delayed.

In a further approach, upon receiving the physical remove instruction, the processor in the server may further identify which SSD is to be removed and/or replaced, preferably such that a user (e.g., drive technician) is properly informed. A specific SSD may be identified by activating a light emitting source positioned on the specific SSD, activating an audio source (e.g., speaker) coupled to the specific SSD, displaying a unique identification number corresponding to the specific SSD on the mobile device, etc.

In still other approaches, the configuration instructions received from the electrical device via the wireless connection may include a command to reconfigure the storage structure of the SSD, a request to determine a relative status of the SSD, an order to return a running failure event counter, etc.

Referring again to FIG. 5, operation 512 of method 500 further includes receiving data from the second device via the physical electrical connection coupling the second device to the SSD. Moreover, operation 514 includes storing the data in a memory of the SSD according to the received configuration instructions, which have preferably been performed by the processor in the second device.

As described above, it is preferred that configuration instructions are only transferred between the electrical device and the SSD via the wireless connection therebetween, while data is received by the SSD via a wired (physical) connection. In other words, the wireless receiver of an SSD may not be able (e.g., may not be configured) to receive data to be stored in the SSD at all. Moreover, configuration instructions may only be wirelessly received at the SSD from an electrical device without establishing and/or using a physical connection therebetween, e.g., such as a wire, bus, cable, etc. However, an SSD may also be coupled to a second device via a physical electrical connection. For example, see physical connection ports 316, 318 coupling storage drive 302 and server 304 in FIG. 3. Thus, the SSD may receive data from the second device via the physical electrical connection therebetween.

It should also be noted that although operation 512 includes receiving data from a second device to be stored in the SSD, data may also be sent to the second device from the SSD along the physical electrical connection therebetween, e.g., according to a read request. However, again the physical electrical connection coupling the SSD and the second device may not be able to transfer information other than data therebetween. Thus, in preferred approaches, configuration instructions may not be transmitted between the SSD and the second device using the physical electrical connection therebetween.

As mentioned above, the components included in the computer system 300 of FIG. 3 are preferably configured to perform any one or more of the processes included in the various embodiments described herein. Thus, according to a second exemplary embodiment, the electrical device 308 of FIG. 3 may be configured to establish the wireless connection between itself and the storage drive 302.

Figure 6:
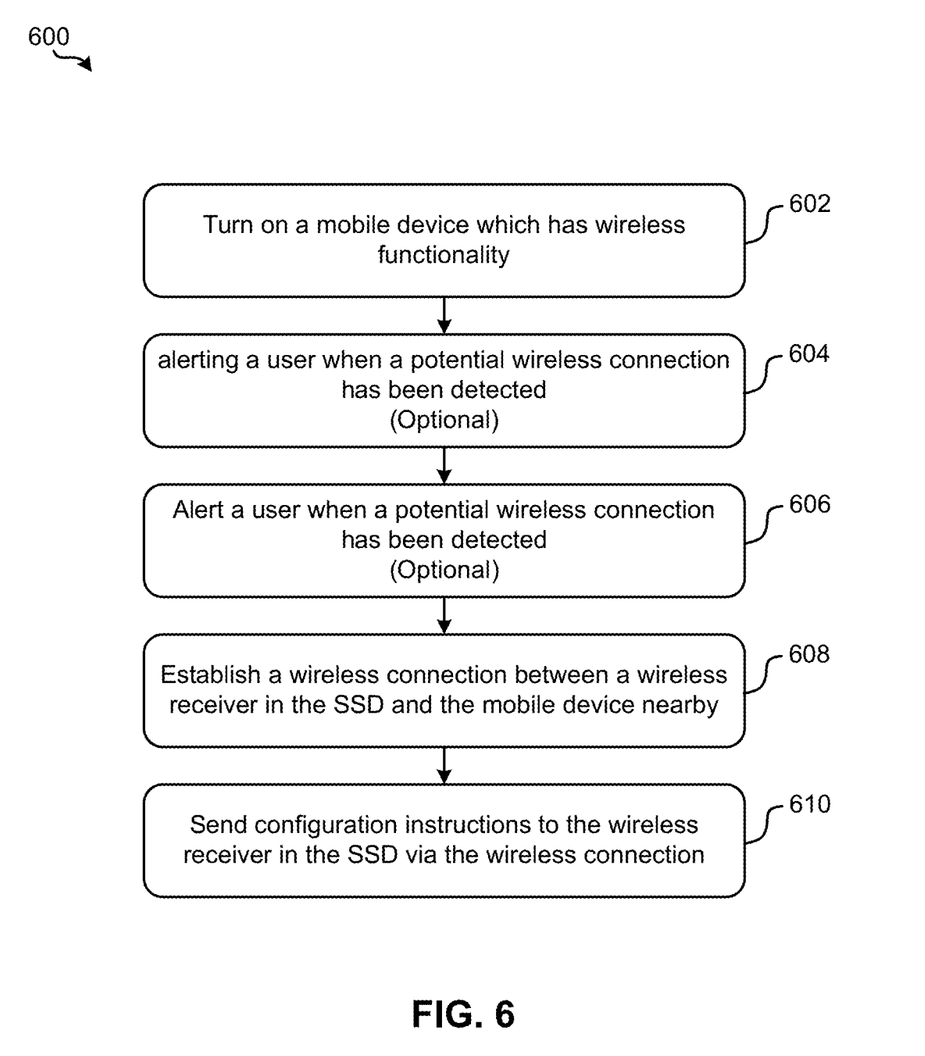
FIG. 6 is a flowchart of a method, according to one embodiment.

Referring now to FIG. 6, a flowchart of a method 600 for an electrical device establishing a wireless connection between itself and a storage drive is shown according to one embodiment. The method 600 may be performed in accordance with the embodiments of the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 first includes turning on a mobile device which has wireless functionality. See operation 602. According to different approaches, the mobile device may be a cell phone, a tablet with wireless capability, a laptop with a wireless antenna and/or card, etc.

Moreover optional operation 604 includes selectively initiating a program configured to establish a wireless connection. In some approaches, the program configured to establish the wireless connection may be an application which is selectively launched by a user. However, in other approaches, the program may automatically launch when the mobile device is powered on.

Optional operation 606 includes alerting a user when a potential wireless connection has been detected. The alert may preferably provide basic information related to the storage device with which the potential wireless connection would be made. According to different approaches, the basic information may include a unique identifier corresponding to the storage device, configuration information corresponding to the storage device, status information corresponding to the storage device, etc. The alert may be displayed in visual form on a display screen of the mobile device, and may be accompanied by an audio signal and/or light signal emitted from the mobile device as well.

Method 600 further includes establishing a wireless connection between a wireless receiver in the SSD and the mobile device nearby upon receiving a user's permission to do so. See operation 608. As mentioned above, a user may be alerted when a potential wireless connection has been detected. In some approaches, the wireless connection may only be established upon receiving the user's permission. Thus, a user may form a wireless connection between a mobile device and a select one of the storage drives in a system. According to an example, which is in no way intended to limit the invention, a server may have three SSDs coupled thereto, each of the three SSDs being configured to establish a wireless connection with a mobile device nearby. Although each of the three SSDs may be detected by the mobile device as a potential wireless connection, only one of the SSDs may actually be selected by the user, thereby establishing a wireless connection therebetween.

Security measures may also be implemented during the process of establishing the wireless connection between the wireless receiver in the SSD and the detected mobile device nearby. For example, a password may be required before the wireless receiver in the SSD engages in a wireless handshake with the mobile device. The number and type of security measures implemented in a given embodiment may vary depending on the importance of the data included in the storage drive, user preference, operating procedures, etc.

Moreover, according to various approaches, the wireless connection may be established using any desired protocol, e.g., including Bluetooth, near field communication (NFC), WiFi Direct, etc.

Furthermore, operation 610 includes sending configuration instructions to the wireless receiver in the SSD via the wireless connection. Once the wireless connection between the mobile device and the SSD has been established, configuration information may be sent to the SSD from the mobile device. Once again, it is preferred that the wireless connection between the wireless receiver in the SSD and the mobile device is only usable to send configuration instructions. Thus, data read and/or write requests may not be sent to the wireless receiver in the SSD via the wireless connection. Similarly, the configuration instructions are wirelessly sent to the SSD from the mobile device without using a physical connection between the SSD and the mobile device (e.g., a wire, bus, cable, etc.).

The configuration instructions sent to the SSD from the mobile device may include any of those configuration instructions included herein. Moreover, the configuration instructions may be performed according to any one or more of the processes described herein. For example, the configuration instructions sent to the SSD may include a drive capability inquiry instruction which causes the mobile device to gain access to vital product data associated with the SSD, a physical remove instruction which causes the SSD to be powered down for removal, a SSD storage structure reconfigure instruction, etc., depending on the desired embodiment.

It follows that various embodiments described herein may enable an improved process of managing storage drives, e.g., such as enterprise class SSDs, over conventional implementations which can only perform management functions after establishing host access. Again, any of the processes herein may be implemented in order to establish a wireless connection between an electrical device (e.g., a mobile device) and a storage drive, preferably such that the electrical device may be used to wirelessly configure the storage drive depending on the desired embodiment. As a result, the improved storage drive management processes described herein are able to increase the ease of access for verified users and thereby increase task efficiency by implementing wireless storage drive management. Moreover, the processes described herein are able to provide the improvements of assuring communication with a particular drive, while enabling drive capability detection and/or removal.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    establishing a wireless connection between a wireless receiver in a solid state drive and a mobile device;
    receiving configuration instructions from the mobile device via the wireless connection;
    sending the received configuration instructions to a processor in a second device via a physical electrical connection coupling the second device to the solid state drive;
    receiving data from the second device via the physical electrical connection coupling the second device to the solid state drive; and
    storing the data in a memory of the solid state drive according to the received configuration instructions.

2. The method as recited in claim 1, wherein the wireless connection is only usable to receive configuration instructions.

3. The method as recited in claim 1, wherein the received configuration instructions include a drive capability inquiry instruction, wherein the processor provides the mobile device access to vital product data associated with the solid state drive in response to receiving the drive capability inquiry instruction.

4. The method as recited in claim 1, wherein the received configuration instructions include a remove instruction, wherein the processor causes the solid state drive to power down in response to receiving the remove instruction.

5. The method as recited in claim 1, wherein more than one solid state drive is coupled to the second device.

6. The method as recited in claim 1, wherein the wireless connection is established using a protocol selected from a group consisting of: Bluetooth, near field communication and WiFi Direct.

7. The method as recited in claim 1, with a proviso that the configuration instructions are wirelessly received at the solid state drive from the mobile device without using a physical connection between the solid state drive and the mobile device.

8. A method, comprising:
    establishing a wireless connection between a wireless receiver in a solid state drive and a mobile device; and
    sending configuration instructions to the wireless receiver in the solid state drive via the wireless connection,
    wherein the wireless connection between the wireless receiver in the solid state drive and the mobile device is only usable to send configuration instructions.

9. The method as recited in claim 8, wherein sending configuration instructions includes sending a drive capability inquiry instruction to the wireless receiver over the wireless connection, wherein the drive capability inquiry instruction causes the mobile device to gain access to vital product data associated with the solid state drive.

10. The method as recited in claim 8, wherein sending configuration instructions includes sending a remove instruction to the wireless receiver over the wireless connection, wherein the remove instruction causes the solid state drive to be powered down.

11. The method as recited in claim 8, wherein the wireless connection is established using a protocol selected from a group consisting of: Bluetooth, near field communication and WiFi Direct.

12. The method as recited in claim 8, wherein the wireless connection is established using Bluetooth.

13. The method as recited in claim 8, with a proviso that the instructions are wirelessly sent to the solid state drive from the mobile device without using a physical connection between the solid state drive and the mobile device.

14. A system, comprising:
a solid state drive, comprising:
   a wireless receiver; and
   a physical connection port,
   wherein the physical connection port is for establishing a physical electrical connection between the wireless receiver and a processor in a second device;
   wherein the solid state drive establishes a wireless connection with an electrical device,
   wherein the solid state drive sends configuration instructions received by the wireless receiver from the electrical device to the processor in the second device,
   wherein the solid state drive receives data from the second device physically connected to the solid state drive via the physical connection port.

15. The system as recited in claim 14, wherein the wireless receiver is only usable to receive configuration instructions.

16. The system as recited in claim 14, comprising the second device.

17. The system as recited in claim 16, wherein the processor in the second device provides the electrical device access to vital product data associated with the solid state drive in response to receiving a configuration instruction from the solid state drive that is a drive capability inquiry instruction.

18. The system as recited in claim 16, wherein the processor in the second device powers down the solid state drive in response to receiving a configuration instruction from the solid state drive that is a remove instruction.

19. The system as recited in claim 14, wherein the wireless connection is established using a protocol selected from a group consisting of: Bluetooth, near field communication and WiFi Direct.

20. The system as recited in claim 14, with a proviso that the configuration instructions are wirelessly received at the solid state drive from the electrical device without using a physical connection between the solid state drive and the electrical device.

* * * * *